United States Patent [19]
Lorenz et al.

[11] Patent Number: 5,799,201
[45] Date of Patent: Aug. 25, 1998

[54] SIGNAL PROCESSOR

[75] Inventors: Dietmar Lorenz, Erlangen; Harald Bauer, Nürnberg; Rainer Dietsch, Heiligenstadt; Karl Hellwig, Nürnberg, all of Germany

[73] Assignee: U.S. Philips Corporation, New York, N.Y.

[21] Appl. No.: 761,237

[22] Filed: Dec. 6, 1996

Related U.S. Application Data

[63] Continuation of Ser. No. 363,185, Dec. 23, 1994, abandoned.

[30] Foreign Application Priority Data

Dec. 23, 1993 [DE] Germany .................. 43 44 157.2

[51] Int. Cl.$^6$ ........................................... G06F 7/00
[52] U.S. Cl. .................. 395/800; 379/800.35; 394/736
[58] Field of Search .................. 395/800.36; 364/736; 379/800.35

[56] References Cited

U.S. PATENT DOCUMENTS

| | | | |
|---|---|---|---|
| 5,175,702 | 12/1992 | Beraud et al. | 364/736 |
| 5,204,938 | 4/1993 | Skapura et al. | 395/27 |
| 5,295,178 | 3/1994 | Nickel et al. | 378/58 |
| 5,442,580 | 8/1995 | Fettweis | 364/736 |
| 5,450,603 | 9/1995 | Davies | 395/800.15 |
| 5,465,375 | 11/1995 | Thepaut et al. | 395/800.22 |

OTHER PUBLICATIONS

M. Kappelan & H. Mucke, "Prozessoren fur besondere Aufgaben", Funkschau 16, 1993, pp. 66–69.

*Primary Examiner*—Larry D. Donaghue
*Attorney, Agent, or Firm*—Leroy Eason

[57] ABSTRACT

A signal processor which includes a first data processing unit for processing data supplied thereto by a data bus system which operates in successive command cycles, and at least one further data processing unit operating in parallel with the first processing unit to process data supplied from the first processing unit during the command cycles. Since the further processing unit does not receive data from the bus system, that processor and still further processors can be added without requiring extension of the bus system. The parallel operation of a plurality of processing units achieves enhanced speed of computation, so that the signal processor is particularly adapted to computation of auto-correlation and cross-correlation functions and for FIR digital filtering.

6 Claims, 2 Drawing Sheets

SIGNAL PROCESSOR

This is a continuation of application Ser. No. 08/363,185, filed Dec. 23, 1994 now abandoned.

BACKGROUND OF THE INVENTION

1. Field of the Invention

The invention relates to a first signal processor comprising a data unit that includes processing means for processing data by arithmetical or logical operations. The invention likewise relates to a radio transceiver comprising such a signal processor.

2. Description of the Related Arts

Radio transceivers for mobile radio are to be capable of executing complex algorithms for speech processing in real time. As a rule, signal processors are used for this purpose. Another possible technical solution is the use of specific chips developed for this application.

Signal processors are special microcomputers for real-time applications. Other fields of application for signal processors are, for example, audio, video, medicine and automotive technology. From the article entitled "Digitale Signalprozessoren, erster Teil: Prozessoren für besondere Aufgaben" by M. Kappelan and H. Mucke, Funkschau 16/1993, pages 66 to 69, is known a signal processor of the type defined in the opening paragraph. The processor includes a data processing unit which is coupled to two data memories by two data buses. An addressing unit addresses by means of the two address buses the data stored in the data memories, which data are then supplied to the data processing unit by the two data buses. The data processing unit includes by a multiplier arranged on the input side, an adder and an accumulator. As the multiplier simultaneously receives from the two data buses the data to be multiplied, the data may be multiplied and added together in one command cycle.

Some signal processors have data processing units which are capable of multiplying two received data in one command cycle, of forming the sum of the product so obtained and the previous accumulator contents, and of overwriting the accumulator with this sum. In other signal processors it is only possible to use a buffered result of a multiplication from a previous command cycle for the addition. Initializing the data processing unit of such signal processors requires an additional command cycle due to the extra buffer. The data processing unit processes the data by pipeline processing in which the received data are processed in various stages, i.e. command cycles. For this purpose, the data processing unit in a two-stage pipeline process has two receiving registers and an accumulator as an output register. In certain signal processors an extra buffer memory is necessary as explained hereinbefore, so that a three-stage pipeline processing is obtained.

The computation of a product sum or of a scalar product of two data vectors is a typical application of a signal processor, for example, when autocorrelation functions and cross-correlation functions to be computed, or when digital signals to be processed with FIR filters. In the case of algorithms requiring much computing time and to be executed in real time, such as, for example, in digital mobile radio, the computing speed of state-of-the-art signal processors may not be sufficient. Increasing the computing speed by connecting further data processing units in parallel, which data processing units are supplied with data by additional data buses, requires much circuitry and cost.

SUMMARY OF THE INVENTION

Therefore, it is an object of the invention to provide a signal processor whose computing speed is increased with little additional circuitry and cost.

In a signal processor of the type defined in the opening paragraph this object is achieved in that at least a second data processing unit operates in parallel with the first data processing unit, and comprises means for processing data derived from the data supplied to the first data processing unit.

Such a signal processor, compared with a signal processor comprising only a single data processing unit, has an increased computing speed for all the cases where the data applied to the first data processing unit or intermediate values or output values derived by the first data processing unit from the applied data, are to be processed by at least a further data processing unit which operates in parallel with the first data processing unit. For this purpose, each further data processing unit operating in this manner is coupled to the first data processing unit. Furthermore, it is particularly advantageous to couple a third data processing unit via at least another data processing unit to the first data processing unit. In these cases, input values, i.e. data applied to the first data processing unit, or intermediate or output values respectively, produced by the first data processing unit, are transferred to a second data processing unit. The input, intermediate or output values of the second unit can be transmitted to a third data processing unit. A fourth data processing unit can be supplied with input, intermediate or output values of the second or third data processing unit. In this manner it is possible to connect an arbitrary number of further data processing units operating in parallel. Such signal processors need not have further data buses in addition to the data buses provided for supplying data to the first data processing unit. The additional circuitry is restricted, in essence, to supplying the further data processing units. Especially the additionally needed surface on a chip on which the signal processor is included is small compared to the inclusion of additional data buses. The arithmetical operations performed in the data processing units are both multiplication and division and addition and subtraction. Examples of logical operations are the AND, NOT, OR or EXCLUSIVE-OR combinations.

In an embodiment of the invention the data applied to the processing means of the first data processing unit is applied to the processing means of at least a further data processing unit in the same and/or in another command cycle.

In many cases identical data vectors whose components are equal to the data to be processed are used by data processing units to compute results. Various results can thus be determined in a number of command cycles which number corresponds to the components of that particular data vector. If the components of a data vector that is processed by the first data processing unit to determine a result are needed only partly for determining a further result, and if the location of the same data in the particular data vectors has changed, it is meaningful to process the same data in different command cycles by means of the processing units to make a simultaneous computation of results by various data processing units possible. Shifting the data with time, which is then necessary, is simply effected by buffering the data.

In an embodiment of the invention a first data bus is coupled to the data processing means of the first and at least one further data processing unit, a second data bus is coupled to the data processing means of the first data processing unit and, via a memory means arranged in each further data processing unit, is also coupled to the data processing means of each further data processing unit to buffer data. All the memory means are connected in series if there is a plurality of further data processing units.

Many signal processors comprise two data buses and a data processing unit. The data buses are used for simultaneously transmitting data to a multiplier arranged in the data processing unit, which multiplier can form the product of two data in one command cycle. The invention is advantageously applicable to these signal processors and increases the computing speed thereof without further data buses being necessary. The extension of a signal processor is restricted to realising at least a further data processing unit on the chip of such a signal processor, which is technically simple. In the embodiment described the first data bus applies data to the first and at least a further data processing unit, which units simultaneously process the data by the processing means provided to this end. The second data bus applies data to the data processing means of the first data processing unit and, via memory means for buffering data, to the processing means of each further data processing unit. If more than one further data processing unit is provided, all the memory means are connected in series for buffering data. In this manner the data transmitted by the second data bus are shifted with time, i.e. processed in different command cycles by the data processing units.

Typical applications of signal processors are, for example, the computation of autocorrelation functions, cross-correlation functions and digital filtering with FIR filters. For these applications it is necessary to form scalar products of data vectors. The data processing units are thus provided for forming products from the supplied data and for summing the products. To ensure proper operation of these functions it is advantageous that the processing means used for processing the data in the data processing units each have a multiplier arranged on the input side, whose output is coupled to a first input of an arithmetic/logic unit. The arithmetic/logic unit has a second input coupled to the output of an accumulator and an output coupled to the input of the accumulator. Data received on the input are first multiplied by the multiplier and then added together with the aid of the arithmetic/logic unit and the accumulator. The arithmetic/logic unit is used as an adder in the present case. In order not to limit the signal processor to the function described here, i.e. the summation of products, the arithmetic/logic unit of at least the first data processing unit is also capable of other arithmetical or logical functions.

To constrain the cost of circuitry for realising the signal processor, the arithmetic/logic unit of each further data processing unit is advantageously simply an adder/subtracter.

This simplified embodiment is sufficient for the typical application of computation of scalar products. However, since the arithmetic/logic unit of the first data processing unit is capable of multiple arithmetical or logical operations, the signal processor can be programmed and used universally.

BRIEF DESCRIPTION OF THE DRAWINGS

The invention will be further explained with reference to the drawings, in which.

DESCRIPTION OF THE PREFERRED EMBODIMENTS

Figure 1:
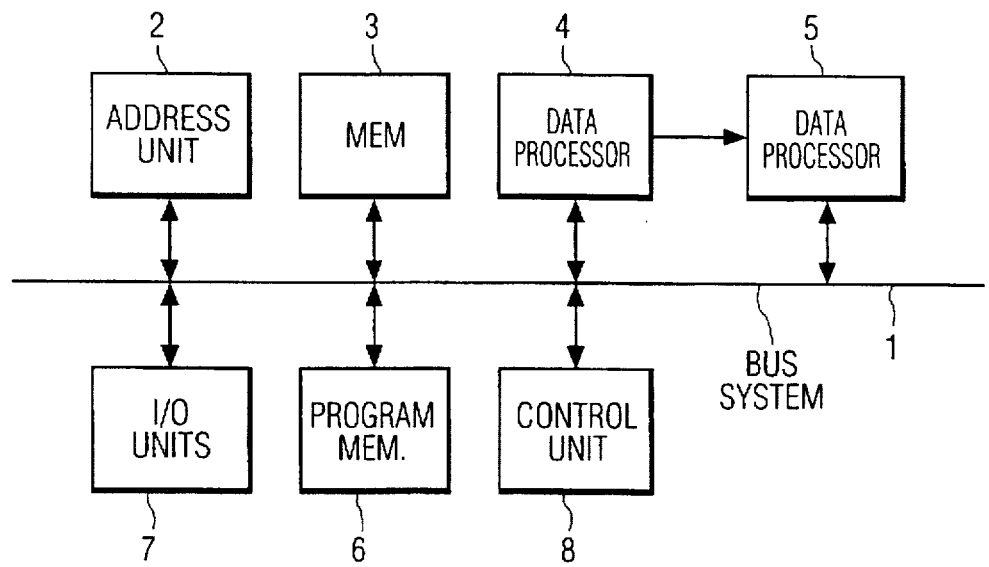
FIG. 1 shows the block circuit diagram of a signal processor in accordance with the invention.

The signal processor shown in FIG. 1 comprises a bus system 1 by which a plurality of function blocks are coupled.

The bus system 1 comprises buses for transmitting data, addresses and control signals. For example, bus system 1 comprises a data bus system and a program bus which are not represented in detail. An addressing unit 2 supplies addresses to a memory unit 3, so that associated memory contents are read out. The memory unit 3 is generally formed by a ROM and/or a RAM. Furthermore, there are provided a first and a second data processing unit 4 and 5 which are used for processing the data read from the memory unit 3. The second data processing unit 5 is not connected directly to the data bus system of the bus system 1, but receives data via the first data processing unit 4. A program memory unit 6 is connected via the program bus to the units connected to the bus system 1.

Furthermore, a peripheral unit 7 is connected to the bus system 1, which unit comprises input and output units. A control unit 8 is coupled via control lines to the units connected to the bus system 1. The control unit 8 controls the program flow and coordinates the access of the units 2 to 7 to the bus system 1.

Figure 2:
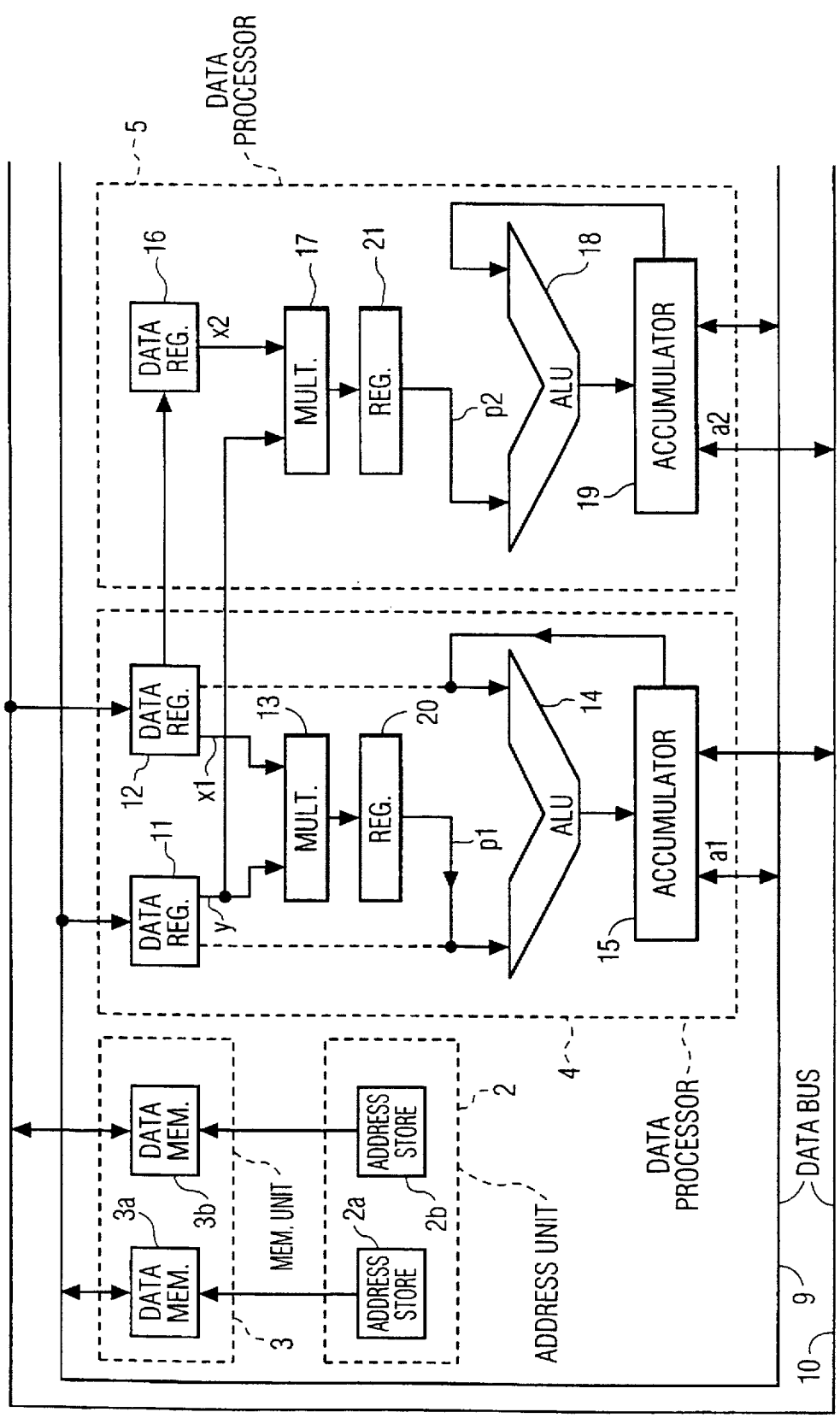
FIG. 2 shows part of the signal processor shown in FIG. 1.

FIG. 2 shows in more detail part of the signal processor shown in FIG. 1. The memory unit 3 has a first data memory 3a and a second data memory 3b. The first data memory 3a is coupled to a first data bus 9 and the second data memory 3b is coupled to a second data bus 10. A first and a second address store, 2a and 2b, which are arranged in the addressing unit 2, are used for supplying addresses to the first data memory 3a and the second data memory 3b.

Furthermore, the structure of the first and second data processing units 4 and 5 are shown. On the side of the input of the first data processing unit 4 a first register 11 receives data from the first data bus 9. A second register 12 receives data from the second data bus 10. The two registers 11 and 12 are used for buffering the received data. The data received from the registers 11 and 12 are multiplied by a multiplier 13 which supplies a product p1 formed by this multiplier to a first input of an arithmetic/logic unit 14 via a register 20. A second input of the arithmetic/logic unit 14, which unit performs the function of an adder or subtracter, is supplied with the memory contents of an accumulator 15 which is then overwritten with the output value of the arithmetic/logic unit 14. The signal processor may also be programmed in such a way that the arithmetic/logic unit 14 performs other arithmetical or logical operations. Furthermore, the first input of the arithmetic/logic unit 14 may also receive data direct from the register 11 instead of from the output of the multiplier 13. A direct link from the output of the register 12 to the second input of the arithmetic/logic unit 14 is also possible in lieu of a link to an input of the multiplier 13. The output of the accumulator 15 is coupled to the memory unit 3 either via the first or via the second data bus 9 or 10, respectively. The data buses 9 and 10 also provide for transporting data from the memory unit 3 to the accumulator 15, for example, to initialize the accumulator 15.

The second data processing unit 5 has a third register 16 which receives the data buffered in the second register 12, buffers it and supplies it to a multiplier 17. The multiplier 17 additionally receives the data buffered in the first register 11. The data available on the outputs of the first register 11 and on the output of the third register 16 are by multiplier 17 and the resultant product p2 is fed to a first input of an arithmetic/logic unit 18 via a register 21. The second input of the arithmetic/logic unit 18 is coupled to an output of an accumulator 19 which is overwritten with the output values of the arithmetic/logic 18. The arithmetic/logic unit 18 is in the present case a simple adder/subtracter. This unit can be, but does not have to be, able to perform further functions.

Similarly to the accumulator 15, the accumulator 19 is coupled to the memory unit 3 via the first or the second data bus 9 or 10.

The present signal processor is particularly suitable for computing a multiplicity of n scalar products of the form $$c(i) = d(i) + \sum_{j=0}^{m-1} a(j) * b(j+i), \quad i=0, 1, \ldots, n-1$$

$a(j)$ and $b(j+i)$ are data that can be interpreted as components of two vectors $\vec{a}$ and $\vec{b}_i$ having dimension m. The data vector $\vec{a}$ is similarly used for computing all the scalar products $c(i)$. The number of different data vectors $\vec{b}_i$ corresponds in the present case to the number n of scalar products $c(i)$ to be computed. The components of the data vectors $\vec{b}_i$ used for computing the scalar products $c(i)$ are partly identical as appears from the formula. The values $d(i)$ represent the initial values at which the associated two accumulators 15 and 19 are initialized to start a computation of two scalar products $c(i)$ and $c(i-1)$ (in the present embodiment this is the value of zero). Such scalar products are formed, more specifically, when autocorrelation functions and cross-correlation functions are performed and when FIR filters are used for a digital filtering.

With reference to the Table below, the parallel computation of two scalar products is further explained with an example of the computation of the scalar products $c(0)$ and $c(10)$.

the registers 11, 12 and 16 arranged on the input side. In the second stage products p1 and p2 are simultaneously formed by the multipliers 13 and 17 from data stored in the registers 11, 12 and 16 in the previous command cycle, which products p1 and p2 are buffered in the registers 20 and 21. In the third stage the products p1 and p2 of the products buffered in registers 20 and 21 in the previous command cycle are simultaneously added to the contents of accumulators 15 and 19. The second stage of the pipeline processing which includes a buffering in the registers 20 and 21 as in the present embodiment, is necessary in all signal processors whose data processing units are incapable of performing, within a command cycle, a multiplication and a summing of the products formed from the contents of the accumulators 15 and 19. In signal processors which are capable of this, the second stage of buffering in the registers 20 and 21 respectively, can be omitted.

The registers 11 and 12 are supplied by the data buses 9 and 10 with data stored in the data memories 3a and 3b. To read the data necessary for a particular command cycle, the addressing unit 2 supplies the necessary addresses to the data memories 3a and 3b in a program-controlled way. To compute the scalar products $c(0)$ and $c(1)$, there is first an initialization in the first three command cycles.

In the first command cycle the data memory 3b transfers value $b(0)$ to the register 12. In the second command cycle the value $b(0)$ is transferred to the register 16 of the second data processing unit 5, and data $a(0)$ and $b(1)$ are read from the data memories 3a and 3b and written in the registers 11 and 12 of the first data processing unit 4.

In a third command cycle the multiplier 13 produces the product $p1=a(0)*b(1)$ from the memory contents of the

TABLE 1

|   | x1 | x2 | y | p1 | p2 | a1 | a2 |
|---|---|---|---|---|---|---|---|
| 1 | b(0) | ? | ? | ? | ? | 0 | 0 |
| 2 | b(1) | b(0) | a(0) | ? | ? | 0 | 0 |
| 3 | b(2) | b(1) | a(1) | a(0)*b(1) | a(0)*b(0) | 0 | 0 |
| 4 | b(3) | b(2) | a(2) | a(1)*b(2) | a(1)*b(1) | a(0)*b(1) | a(0)*b(0) |
| 5 | b(4) | b(3) | a(3) | a(2)*b(3) | a(2)*b(2) | $\sum_{j=0}^{1} a(j)*k$ | $\sum_{j=0}^{1} a(j)*k$ |
| 6 | b(5) | b(4) | a(4) | a(3)*b(4) | a(3)*b(3) | $\sum_{j=0}^{2} a(j)*k$ | $\sum_{j=0}^{2} a(j)*k$ |
| . | . | . | . | . | . | . | . |
| . | . | . | . | . | . | . | . |
| . | . | . | . | . | . | . | . |
| m+3 | b(m+2) | b(m+1) | a(m+1) | a(m)*b(m+1) | a(m)*b(m) | $\sum_{j=0}^{m-1} a(j)*k$ | $\sum_{j=0}^{m-1} a(j)*k$ |

The rows 1 to m+3 in the first column of the Table are used for explaining m+3 required command cycles of the signal processor. x1 and x2 represent the output value and memory contents respectively, of registers 12 and 16. y corresponds to the value present on the output of register 11. The products of multiplexers 13 and 17 are stated in the columns under p1 and p2. a1 and a2 are the memory contents of the accumulators 15 and 19. a1 and a2 are initialized at $d(i)=0$ without loss of generality before the computation of two scalar products $c(i)$. The signal processor further explained with reference to FIG. 2 processes data according to the pipeline processing principle. In the present case a three-stage pipeline processing is used i.e. the data processing units have three stages. The three stages are passed in three successive command cycles by the data transmitted by the data buses 9 and 10. In the first stage data are loaded in registers 11 and 12 of the previous second command cycle and stores p1 in register 20. The multiplier 17 produces the product $p2=a(0)*b(0)$ from the memory contents of registers 11 and 16 of the previous second command cycle and stores p2 in register 21. Similarly to the previous command cycles, the memory contents of the register 16 are overwritten by the memory contents of the register 12. Now it is possible to write further data $a(1)$ and $b(2)$ in the registers 11 and 12.

With the described first three command cycles the initialization is terminated. The registers 11 and 16 have indefinite memory contents in the first command cycle. The values p1 and p2 stored in the registers 20 and 21 are indefinite in the first and second command cycles. During the initialization the memory contents of the accumulators 15 and 19 respectively are set to $d(1)$ and $d(0)$ respectively, i.e. to the value zero in the present example.

In the fourth command cycle there is first a summation of the products p1 and p2 on the accumulators 15 and 19 which products were determined by the multipliers 13 and 17 in the previous command cycle. The further data processing is effected analogously to above described operation of the signal processor and can be learnt from the Table relating to FIG. 2. In the command cycle m+3 the memory contents a1 and a2 of accumulators 15 and 19 are equal to the scalar products c(1) and c(0). These scalar products are transmitted via the data buses 9 and 10 to the memory unit 3 and stored there for further processing. Subsequently, the parallel computation of the next two scalar products c(2) and c(3) can be effected.

Disregarding the few command cycles for the initialization, the present signal processor compared with a signal processor comprising only a single data processing unit provides a doubling of the computing speed when scalar products of said type are computed. An increase of the computing speed can always be achieved, in principle, if the data necessary for computing a scalar product are also needed at least partly for computing one or various other scalar products.

To increase the computing speed, further data processing units (not shown) which have a similar structure to the second data processing unit 5 can be incorporated in the signal processor. All the input side registers of these further data processing units are connected in series with the registers 12 and 16. The output of the register 11 is connected to an input of the multipliers of all the data processing units. The computed scalar products of the additional data processing units are also transmitted by the data bus 9 or data bus 10 to the memory unit 3 and stored there for further processing. Advantageously, the second data processing unit 5 and any further data processing unit do not need additional data buses, so that the additional circuitry is insignificant.

The registers 11 and 12 and 20 and 21 respectively, serve to ensure error-free pipeline processing. With sufficiently fast signal processors, two-stage pipeline processing may be effected, so that the registers 20 and 21 become redundant.

Figure 3:
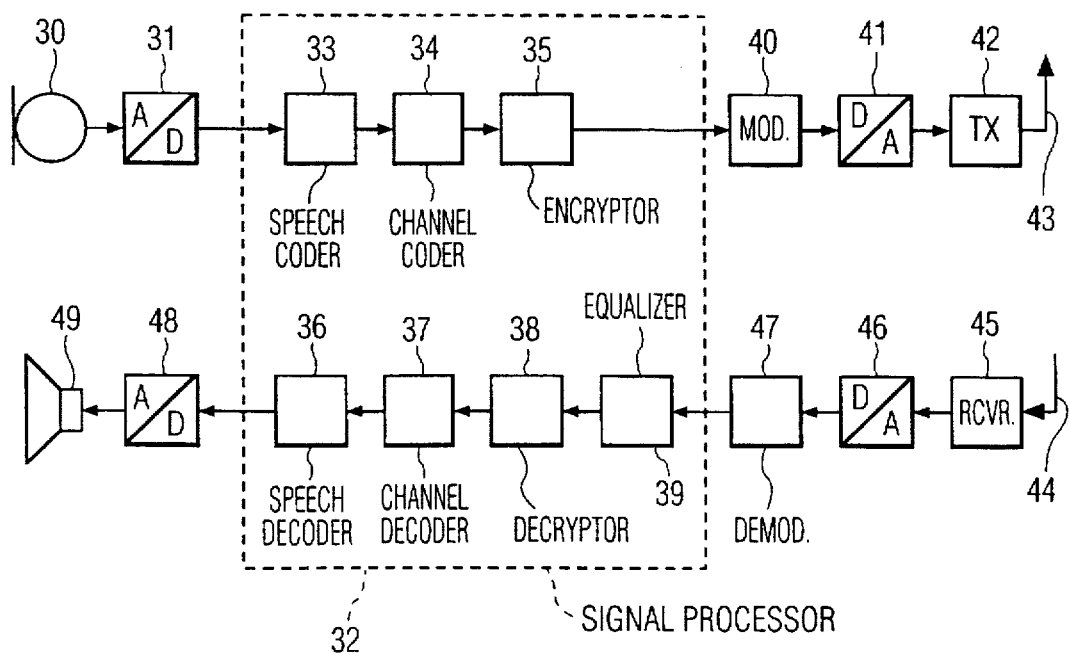
FIG. 3 shows a block circuit diagram of a digital radio telephone comprising a signal processor as shown in FIGS. 1 and 2.

The block circuit diagram shown in FIG. 3 of a digital radio telephone comprises a send and a receive path. The speech signals received from a microphone 30 are converted to binary coded data words by an analog-to-digital converter 31. The data words are applied to a signal processor 32. The blocks 33 to 39 are shown in the signal processor 32 in FIG. 3 to indicate the various functions performed by the signal processor. Block 33 performs a speech coding of the data blocks generated by the analog-to-digital converter 31, after which block 34 performs a channel coding and finally block 35 performs an encryption. These encrypted data words are GMSK modulated in a modulator 40. This modulator is connected to an output of the signal processor 32. Subsequently, the modulated digital signals are converted into analog modulated signals in a digital-to-analog converter 41. These modulated analog signals are applied to a transmitting circuit 42 which generates radio signals to be radiated via an antenna 43. The path described thus far represents the send path of the digital radio telephone.

The receive path of the digital radio telephone will be described in the following: Analog radio signals received from an antenna 44 are processed in a receiving circuit 45 and analog modulated signals are applied to an analog-to-digital converter 46. The digitally modulated signals produced by the analog-to-digital converter 46 are demodulated in a demodulator 47 and applied to the signal processor 32.

The block 39 in signal processor 32 is to indicate the subsequent equalization of the demodulated signals. Subsequently, a decryption function is performed which is symbolized by block 38. After a channel decoding in block 37 and a speech decoding in block 36 the signal processor 32 applies digital data words to a digital-to-analog converter 48, which applies the analog speech signals to a loudspeaker 49.

The signal processor 32 can be used not only as a radio telephone in a mobile station of a mobile radio station, but also in a base station of such a system. The structure of the signal processor explained with reference to FIG. 2 is furthermore not restricted to signal processors. For example, the structure can also be realised on microcomputers or chips specifically developed for radio transceivers of a mobile radio system (mobile and base stations).

We claim:

1. A signal processor comprising:

a data bus system for supplying, during successive command cycles, data symbols to be processed;

a first data processing unit having first and second data stores coupled to the bus system for storing data supplied therefrom during successive command cycles, the data symbols in said first and second stores at the end of a given command cycle being processed by said first processing unit during the next succeeding command cycle;

a second data processing unit having first and second inputs respectively coupled to said first and second stores of the first processing unit for receiving therefrom during a given command cycle data symbols which had been stored therein during the immediately preceding command cycle;

the second input of said second processing unit being an input of a third data store comprised therein for storing data symbols received from said second data store, the first input of said second processing unit receiving data symbols from said first data store; and the data symbols received from said first data store and the data symbols in said third data store being processed by said second processing unit concurrently with processing by the first processing unit of data symbols stored in said first and second data stores;

whereby data symbols supplied by said bus system to said first processing unit during successive command cycles are made available to said first and second processing units so as to enable concurrent processing thereof by the first and second processing units and without requiring supply of data symbols from said bus system directly to said second processing unit.

2. A signal processor as claimed in claim 1, comprising one or more further data processing units, each having a data store coupled in series to the data store of the preceding processing unit and each having an input coupled to an output of said first data store in said first processing unit; the data store of each further processing unit receiving data symbols from the data store of the preceding processing unit during each command cycle and processing the received data during the next succeeding command cycle; whereby data symbols supplied by said bus system are concurrently processed by all of said processing units and without requiring supply of data symbols from said bus system directly to any of said further processing units.

3. A signal processor as claimed in claim 1, wherein during each command cycle each of said processing units derives the product of data symbols received thereby and stored therein and forms a running summation of all products so derived during that command cycle and previous command cycles.

4. A signal processor as claimed in claim 2, wherein each of said further data processing units further comprises:
   a multiplier having a pair of inputs respectively coupled to a data store of that processing unit and to said first data store of said first processing unit;
   an arithmetic/logic unit having a first input coupled to an output of said multiplier; and
   an accumulator having an input coupled to an output of said arithmetic/logic unit, and having an output coupled to a second input of said arithmetic/logic unit.

5. A signal processor as claimed in claim 4, wherein said arithmetic/logic unit is an adder/subtracter.

6. A signal processor as claimed in claim 1 comprised in a radio transceiver, the data supplied by said bus system representing signals transmitted or received by said transceiver.

* * * * *